United States Patent
Jung et al.

(10) Patent No.: US 9,666,859 B2
(45) Date of Patent: May 30, 2017

(54) ANODE INCLUDING SILICON-BASED MATERIAL AND CARBON MATERIAL, AND LITHIUM SECONDARY BATTERY INCLUDING THE SAME

(71) Applicant: LG Chem, Ltd., Seoul (KR)

(72) Inventors: Hye Ran Jung, Daejeon (KR); Seung Youn Choi, Daejeon (KR); Yong Ju Lee, Daejeon (KR); Mi Rim Lee, Daejeon (KR); Je Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 328 days.

(21) Appl. No.: 13/973,010

(22) Filed: Aug. 22, 2013

(65) Prior Publication Data

US 2013/0337325 A1    Dec. 19, 2013

Related U.S. Application Data

(63) Continuation of application No. PCT/KR2013/004301, filed on May 15, 2013.

(30) Foreign Application Priority Data

May 31, 2012  (KR) ........................ 10-2012-0058785
May 14, 2013  (KR) ........................ 10-2013-0054277

(51) Int. Cl.

| | | |
|---|---|---|
| H01M 4/13 | (2010.01) |
| H01M 4/131 | (2010.01) |
| H01M 4/133 | (2010.01) |
| H01M 4/134 | (2010.01) |
| H01M 4/52 | (2010.01) |
| H01M 4/38 | (2006.01) |
| H01M 4/50 | (2010.01) |
| H01M 4/04 | (2006.01) |
| H01M 4/36 | (2006.01) |
| H01M 4/587 | (2010.01) |
| H01M 10/0525 | (2010.01) |
| H01M 4/485 | (2010.01) |
| H01M 4/48 | (2010.01) |
| H01M 4/02 | (2006.01) |

(52) U.S. Cl.
CPC ......... *H01M 4/133* (2013.01); *H01M 4/0471* (2013.01); *H01M 4/131* (2013.01); *H01M 4/364* (2013.01); *H01M 4/366* (2013.01); *H01M 4/386* (2013.01); *H01M 4/483* (2013.01); *H01M 4/485* (2013.01); *H01M 4/50* (2013.01); *H01M 4/52* (2013.01); *H01M 4/587* (2013.01); *H01M 10/0525* (2013.01); *H01M 2004/021* (2013.01)

(58) Field of Classification Search
CPC ...... H01M 4/133; H01M 4/366; H01M 4/587; H01M 4/131; H01M 4/386; H01M 4/50; H01M 4/52; H01M 10/0525
See application file for complete search history.

(56) References Cited

U.S. PATENT DOCUMENTS

| | | | |
|---|---|---|---|
| 6,482,547 B1 * | 11/2002 | Yoon et al. | 429/231.8 |
| 2003/0129494 A1 | 7/2003 | Kaneda et al. | |
| 2005/0186475 A1 | 8/2005 | Jeong et al. | |
| 2007/0190413 A1 * | 8/2007 | Lee et al. | 429/218.1 |
| 2010/0119956 A1 * | 5/2010 | Tokuda et al. | 429/338 |
| 2011/0097629 A1 * | 4/2011 | Yew et al. | 429/231.8 |
| 2011/0175020 A1 | 7/2011 | Lee et al. | |
| 2012/0009452 A1 | 1/2012 | Ueda | |

FOREIGN PATENT DOCUMENTS

| | | |
|---|---|---|
| CN | 1581544 A | 2/2005 |
| EP | 2450986 A1 | 5/2012 |
| JP | 10-223229 | 8/1998 |
| JP | 2000-243396 A | 9/2000 |
| JP | 2002-373653 A | 12/2002 |
| JP | 2008192488 A * | 8/2008 |
| JP | 2010-251060 A | 11/2010 |
| JP | 2012033375 A | 2/2012 |
| JP | 2013-225502 A | 10/2013 |
| KR | 10-2003-0027191 A | 9/2001 |
| KR | 10-2005-0087147 A | 8/2005 |

OTHER PUBLICATIONS

Extended Search Report from European Application No. 13 79 7624, dated Sep. 28, 2015.

* cited by examiner

*Primary Examiner* — Jonathan Jelsma
(74) *Attorney, Agent, or Firm* — Lerner, David, Littenberg, Krumholz & Mentlik, LLP

(57) ABSTRACT

Provided is an anode including an anode active material including $SiO_x$ ($0 < x \leq 1$) and a carbon material having a surface coated with amorphous carbon, wherein a crystal orientation ratio is in a range of 0.07 to 0.17. A lithium secondary battery including the anode of the present invention may have improved life characteristics, low thickness change rate, and improved initial discharge capacity.

8 Claims, No Drawings

ANODE INCLUDING SILICON-BASED MATERIAL AND CARBON MATERIAL, AND LITHIUM SECONDARY BATTERY INCLUDING THE SAME

CROSS-REFERENCE TO RELATED APPLICATION

This application is a continuation of International Application No. PCT/KR2013/004301, filed May 15, 2013, which claims priority under 35 U.S.C. §119(a) to Korean Application No. 10-2013-0054277, filed on May 14, 2013 in the Republic of Korea, and Korean Application No. 10-2012-0058785, filed on May 31, 2012 in the Republic of Korea, the disclosures of which are incorporated herein by reference.

TECHNICAL FIELD

The present invention relates to an anode including a silicon-based material and a carbon material, and a lithium secondary battery including the same.

BACKGROUND ART

Recently, lithium secondary batteries have received the most attention due to their characteristics of high energy density and long lifetime. In general, a lithium secondary battery includes an anode formed of a carbon material or a lithium metal alloy, a cathode formed of lithium metal oxide, and an electrolyte in which a lithium salt is dissolved in an organic solvent.

Lithium has been initially used as an anode active material constituting the anode of the lithium secondary battery. However, lithium may have low reversibility and safety, a carbon material has currently been mainly used as the anode active material of the lithium secondary battery. Although the carbon material may have a capacity smaller than that of lithium, the carbon material may have small volume changes and excellent reversibility, and may be advantageous in terms of cost.

However, the demand for high-capacity lithium secondary batteries has gradually increased as the use of the lithium secondary battery has expanded. As a result, a high-capacity electrode active material replaceable with a low-capacity carbon material has been required. For this purpose, research into using a (semi) metal, such as silicon (Si) and tin (Sn), which exhibits a charge and discharge capacity higher than that of a carbon material and is electrochemically alloyable with lithium, as an electrode active material has been undertaken.

Among the above materials, since a silicon-based material has a capacity (4190 mAh/g) 11 times or more higher than a theoretical capacity (372 mAh/g) of a carbon-based anode active material, the silicon-based material is on the spotlight as a material for replacing the carbon-based anode active material. However, since volume expansion of the silicon-based material during the intercalation of lithium ions is 3 times or more when the silicon-based material is only used, a capacity of a battery tends to decrease as charging and discharging of the battery proceed, and the silicon-based material may separate from a current collector due to the volume expansion.

DISCLOSURE OF THE INVENTION

Technical Problem

The present invention provides an anode having improved life characteristics, low thickness change rate, and improved initial discharge capacity, and a lithium secondary battery including the same.

Technical Solution

According to an aspect of the present invention, there is provided an anode including an anode active material including $SiO_x$ ($0<x\leq1$) and a carbon material having a surface coated with amorphous carbon, wherein a crystal orientation ratio is in a range of 0.07 to 0.17.

MODE FOR CARRYING OUT THE INVENTION

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides an anode including $SiO_x$ ($0<x\leq1$) and a carbon material having a surface coated with amorphous carbon, and having a crystal orientation ratio ranging from 0.07 to 0.17.

The anode according to an embodiment of the present invention may use the advantages of a silicon-based material for increasing a capacity by including $SiO_x$ ($0<x\leq1$) and a carbon material having a surface coated with amorphous carbon, and simultaneously, may decrease a degree of thickness expansion of an entire battery by using the carbon material. In addition, the crystal orientation ratio of the anode may be controlled by coating the surface of the carbon material with amorphous carbon, and thus, the anode may further improve an initial discharge capacity and decrease a volume expansion.

In general, hardness of an anode may change according to a surface of an active material, e.g., a carbon material. That is, since hard graphite may form low electrode density by decreasing the crystal orientation ratio of the anode after pressing during the preparation of the anode, energy density per unit volume may decrease. Also, the softer the graphite is, the higher the crystal orientation ratio of the anode after the pressing is. Thus, peel strength of the anode may increase. Surface hardness of the carbon material may be affected by the degree of surface coating of the carbon material.

Therefore, the anode according to the embodiment of the present invention may not only exhibit stable and high electrode density during the pressing, but may also further improve an initial discharge capacity and decrease a volume expansion by using the advantages of a silicon-based material for increasing a capacity as well as controlling the crystal orientation ratio of the anode by coating the surface of the carbon material with amorphous carbon.

In general, in the case that crystal orientation of the anode is parallel to a surface of the anode after the preparation of the anode, volume expansion caused by the intercalation of lithium ions during charging is reflected in a Z-axis direction (thickness direction) to increase a thickness expansion rate of the anode.

In the present invention, since the volume expansion caused by the intercalation of lithium ions may be distributed when the crystal orientation of the anode is randomly maintained, the thickness expansion rate may be minimized and the initial discharge capacity may be improved.

Therefore, the crystal orientation ratio of the anode according to the embodiment of the present invention may be in a range of 0.07 to 0.17. In the case that the crystal orientation ratio is less than 0.07, the thickness expansion rate of the anode may be high, and in the case in which the crystal orientation ratio is greater than 0.17, a thickness of the anode itself may be high, because the anode may not be sufficiently pressed.

A density of the anode according to the embodiment of the present invention may be in a range of 1.5 g/cc to 1.6 g/cc. In the case that the density of the anode is less than the above range, a degree of the expansion of the electrode may increase during the charging of the battery, and battery capacity per unit volume of the electrode may decrease.

According to an embodiment of the present invention, graphite may be used as the carbon material. Specifically, the carbon material may include any one selected from the group consisting of natural graphite, artificial graphite, mesocarbon microbeads (MCMB), carbon fibers, and carbon black, or a mixture of two or more thereof.

According to an embodiment of the present invention, the crystal orientation ratio of the anode may be changed according to a degree of amorphous carbon coating on the surface of the carbon material.

Specifically, the coating may be performed by heat treating after the carbon material and the amorphous carbon are mixed. However, the coating method is not limited thereto. For example, the carbon material and the amorphous carbon are mixed and a mixture is then put into a sintering furnace. Then, the surface of the carbon material, for example, may be coated with amorphous carbon by sintering at a temperature ranging from 300° c to 1400° C.

Examples of the amorphous carbon may include hard carbon, an amorphous carbon-based material obtained by thermal decomposition of various organic materials, such as a phenol resin or a furan resin; soft carbon, an amorphous carbon-based material obtained by carburization of cokes, needle cokes, coal tar pitch, petroleum pitch, or heavy oil; or a mixture thereof.

The amorphous carbon may be included in an amount ranging from 0.1 wt % to 20 wt % based on the carbon material. In the case that the amount of the amorphous carbon is less than 0.1 wt %, the crystal orientation of the anode may decrease because the amount of the amorphous carbon coated on the carbon material is small. In the case in which the amount of the amorphous carbon is greater than 20 wt %, weight of the anode may increase and an increase in capacity may not be large.

A coating thickness of the amorphous carbon may be in a range of 10 nm to 700 nm.

Also, a weight ratio of the $SiO_x$ ($0<x\leq1$) to the carbon material having a surface coated with amorphous carbon may be in a range of 3:97 to 70:30, and for example, may be in a range of 10:50 to 10:97. In the case that the weight ratio of the $SiO_x$ ($0<x\leq1$) is less than 3, the capacity of the battery may not be improved, and in the case in which the weight ratio of the $SiO_x$ ($0<x\leq1$) is greater than 70, the lifetime of the battery may be reduced.

In the anode according to the embodiment of the present invention, the $SiO_x$ ($0<x\leq1$) may be silicon monoxide. Silicon particles generally used may accompany very complex crystal changes in reactions which electrochemically absorb, store, and release lithium atoms. Composition and crystal structure of the silicon particles change to silicon (Si) (crystal structure: Fd3m), LiSi (crystal structure: I41/a), $Li_2Si$(crystal structure: C2/m), $Li_7Si_2$(Pbam), and $Li_{22}Si_5$ (F23) as the reactions which electrochemically absorb, store, and release lithium atoms proceed. Also, a volume of the silicon particle expands to about 4 times according to the complex changes in the crystal structure. Therefore, when a charge and discharge cycle is repeated, intercalation sites of lithium atoms initially included in the silicon particles are damaged as the silicon particles are fractured and bonds between the lithium atoms and the silicon particles are formed, and thus, cycle lifetime may be significantly reduced.

With respect to the $SiO_x$ ($0<x\leq1$) in the anode according to the embodiment of the present invention, silicon atom and oxygen atom are covalent bonded. In order for the silicon atom to be bonded with a lithium atom, the covalent bond between the silicon atom and the oxygen atom must be broken. However, since an amount of energy capable of breaking the covalent bond may not be sufficient, a structure of the $SiO_x$ ($0<x\leq1$) may not be destroyed even if lithium atoms are inserted. That is, since the reaction between the $SiO_x$ ($0<x\leq1$) and the lithium atoms may be performed while the structure of the $SiO_x$ ($0<x\leq1$) is maintained, the cycle lifetime and capacity may increase.

The anode according to the embodiment of the present invention may be prepared by a typical method known in the art. For example, a binder, a conductive agent, and a dispersant, if necessary, as well as a solvent are mixed with the anode active material and stirred to prepare a slurry, and a metal current collector is then coated with the slurry and pressed. Thereafter, the anode may be prepared by drying the metal current collector.

In the anode according to the embodiment of the present invention, the crystal orientation ratio denotes that crystal structures in the anode are arranged in a predetermined direction, and the crystal orientation ratio may be measured by X-ray diffraction (XRD).

After a (110) plane and a (004) plane of the active material in the electrode are measured by XRD, the crystal orientation ratio of the anode active material included in the anode according to the embodiment of the present invention is an area ratio ((110)/(004)) obtained by integrating peak strengths of the (110) plane and the (004) plane. More particularly, XRD measurement conditions are as below.

target: Cu(Kα-line) graphite monochromator slit: divergence slit=1 degree, receiving slit=0.1 mm, scattering slit=1 degree measurement range and step angle/measurement time: (110)plane: 76.5°<2θ<78.5°, 0.01°/3 seconds (004) plane: 53.5°<2θ<56.0°, 0.01°/3 seconds where "2θ" represents a diffraction angle. The above XRD measurements are only an example, and other measurement methods may also be used. The crystal orientation ratio of the anode may be measured by using the above-described method.

Also, the present invention provides a lithium secondary battery including a cathode, the anode, and a separator disposed between the cathode and the anode.

The lithium secondary battery according to an embodiment of the present invention may include all types of typical lithium secondary batteries, such as a lithium metal secondary battery, a lithium-ion secondary battery, a lithium polymer secondary battery, or a lithium ion polymer secondary battery.

The lithium secondary battery of the present invention may be prepared according to a typical method known in the art. For example, the lithium secondary battery may be prepared by inserting a porous separator between the cathode and the anode, and introducing a non-aqueous electrolyte.

In the lithium secondary battery according to the embodiment of the present invention, the cathode may be prepared according to a typical method known in the art. For example, a binder, a conductive agent, and a dispersant, if necessary, as well as a solvent are mixed with a cathode active material and stirred to prepare a slurry, and a metal current collector is then coated with the slurry and pressed. Thereafter, the cathode may be prepared by drying the metal current collector.

Lithium-containing transition metal oxide may be used as the cathode active material. For example, any one selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0\leq y<1$), $Li_xNi_{1-y}Mn_yO_2$ ($0.5<x<1.3$, $0\leq y\leq 1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}Co_zO_4$ ($0.5<x<1.3$, $0<z<2$), $Li_xCoPO_4$ ($0.5<x<1.3$), and $Li_xFePO_4$ ($0.5<x<1.3$), or a mixture of two or more thereof may be used. The lithium-containing transition metal oxide may be coated with a metal, such as aluminum (Al), or a metal oxide. Also, sulfide, selenide, and halide may be used in addition to the lithium-containing transition metal oxide.

Any metal having high conductivity and no reactivity in a voltage range of the battery may be used as the metal current collector, in which the slurry of the electrode active material may be easily adhered thereto. Non-limiting examples of the cathode current collector may include aluminum, nickel, or a foil prepared by a combination thereof, and non-limiting examples of the anode current collector may include copper, gold, nickel, or a copper alloy, or a foil prepared by a combination thereof.

In the cathode and the anode of the lithium secondary battery, a binder, such as polytetrafluoroethylene (PTFE), polyvinylidene fluoride (PVdF), or a styrene-butadiene rubber (SBR), is used in order to maintain a molded article by binding active material particles.

The binder may be categorized as a solvent-based binder (i.e., binder using an organic solvent as a solvent) represented as PVdF and a water-based binder (i.e., binder using water as a solvent) represented as a SBR. Since the water-based binder, different from the solvent-based binder, may be economical, may be environmentally friendly, may not be harmful to the health of workers, and may have binding effect larger than that of the solvent-based binder, a ratio of the active material for the same volume may be increased. Thus, the capacity of the lithium secondary battery may be increased. A SBR may be used as the water-based binder, and if necessary, the SBR may be used in the electrode by being dispersed in water with a thickener.

The conductive agent is not particularly limited so long as it is an electrically conductive material that does not generate chemical changes in an electrochemical device. In general, acetylene black, carbon black, graphite, carbon fibers, carbon nanotubes, metal powder, conductive metal oxide, and an organic conductive agent may be used.

According to an embodiment of the present invention, a thickener may be further included in the anode or the cathode of the lithium secondary battery for viscosity control. The thickener may be a cellulose-based compound. For example, the thickener may be any one selected from the group consisting of carboxymethyl cellulose (CMC), hydroxy methyl cellulose, hydroxy ethyl cellulose, and hydroxy propyl cellulose, or a mixture of two or more thereof. According to an embodiment of the present invention, the thickener, for example, may be CMC.

An organic solvent, such as N-methylpyrrolidone (NMP), dimethylformamide (DMF), acetone, and dimethylacetamide, or water, may be used as the solvent used for forming the cathode and the anode. These solvents may be used alone or in combination of two or more. However, in the case of forming the anode, water is used as the solvent. An amount of the solvent used may be sufficient if the solvent may dissolve and disperse the electrode active material, the binder, and the conductive agent in consideration of a coating thickness of the slurry and manufacturing yield.

The lithium secondary battery of the present invention may include a separator. The separator is not particularly limited, but a porous separator may be used. Non-limiting examples of the separator may include a polypropylene-based, polyethylene-based, or polyolefin-based porous separator.

A shape of the lithium secondary battery of the present invention is not limited, and a cylindrical type using a can, a prismatic type, a pouch type, or a coin type may be used.

Hereinafter, the present invention will be more fully described according to specific embodiments. The present invention may, however, be embodied in many different forms and should not be construed as being limited to the embodiments set forth herein. Rather, these embodiments are provided so that this disclosure will be thorough and complete, and will fully convey the scope of the present invention to those skilled in the art.

EXAMPLE 1

Anode Preparation

A mixture, in which SiO having a particle diameter of 5 µm and graphite having a surface coated with amorphous carbon were mixed to have a weight ratio of 10:90, was used as an anode active material. The anode active material, acetylene black as a conductive agent, a SBR as a binder, and CMC as a thickener were mixed at a weight ratio of 88:2:5:5, and distilled water was mixed therewith to prepare an anode active material slurry.

The graphite having a surface coated with amorphous carbon was prepared in such a manner that graphite and heavy oil as amorphous carbon were mixed at a weight ratio of 85:15 and the mixture was then heat treated at 1000° C. to coat the surface of the graphite with amorphous carbon. An amount of the amorphous carbon coated on the surface thereof was about 2 wt %, and a thickness of the surface coating was 15 nm. One surface of a copper current collector was coated with the prepared slurry to a thickness of 65 µm, and then dried and pressed. Then, an anode was prepared by punching into a predetermined size. A crystal orientation ratio of the anode at an anode density of 1.6 g/cc was 0.07.

EXAMPLE 2

An anode was prepared in the same manner as Example 1 except that an amount of amorphous carbon coated on a surface of graphite was 7 wt %. A crystal orientation ratio of the anode at an anode density of 1.6 g/cc was 0.12.

EXAMPLE 3

An anode was prepared in the same manner as Example 1 except that an amount of amorphous carbon coated on a surface of graphite was 10 wt %. A crystal orientation ratio of the anode at an anode density of 1.6 g/cc was 0.17.

<Lithium Secondary Battery Preparation>

EXAMPLES 4 to 6

$LiCoO_2$ was used as a cathode active material. The cathode active material, acetylene black as a conductive agent, and PVdF as a binder were mixed at a weight ratio of 94:3.5:2.5, and the mixture was then added to NMP to prepare a cathode active material slurry. One surface of an aluminum foil was coated with the prepared slurry, and then dried and pressed. Then, a cathode was prepared by punching into a predetermined size.

Polyolefin separators were respectively disposed between the anodes prepared in Examples 1 to 3 and the cathode prepared as above. Then, an electrolyte, in which 1M $LiPF_6$ was dissolved in a solvent having ethylene carbonate (EC) and ethylmethyl carbonate (EMC) mixed at a volume ratio of 30:70, was injected thereinto to prepare lithium secondary batteries.

COMPARATIVE EXAMPLE 1

An anode was prepared in the same manner as Example 1 except that SiO and graphite not coated with amorphous carbon were used. A crystal orientation ratio of the anode at an anode density of 1.6 g/cc was 0.06.

COMPARATIVE EXAMPLE 2

An anode was prepared in the same manner as Example 1 except that graphite and graphite coated with amorphous carbon were used. A crystal orientation ratio of the anode at an anode density of 1.6 g/cc was 0.07.

COMPARATIVE EXAMPLE 3

An anode was prepared in the same manner as Example 1 except that a flake graphite active material not coated with amorphous carbon was used. A crystal orientation ratio of the anode at an anode density of 1.6 g/cc was 0.04.

COMPARATIVE EXAMPLE 4

An anode was prepared in the same manner as Example 1 except that an active material was used, in which an amount of amorphous carbon coated on a surface of graphite was 25 wt %. A crystal orientation ratio of the anode at an anode density of 1.8 g/cc was 0.11 (since the pressing characteristics were poor, i.e., the pressing was not facilitated due to the excessive amount of coating, the crystal orientation ratio was not measured at an anode density of 1.6 g/cc).

COMPARATIVE EXAMPLE 5

An anode was prepared in the same manner as Example 1 except that an active material was used, in which an amount of amorphous carbon coated on a surface of graphite was 30 wt %. A crystal orientation ratio of the anode at an anode density of 1.8 g/cc was 0.15 (since the pressing characteristics were poor, i.e., the pressing was not facilitated due to the excessive amount of coating, the crystal orientation ratio was not measured at an anode density of 1.6 g/cc).

COMPARATIVE EXAMPLES 6 to 10

Lithium secondary batteries were prepared in the same manner as Examples 4 to 6 except that the anodes prepared in Comparative Examples 1 to 5 were respectively used.

EXPERIMENTAL EXAMPLE 1

Life Characteristics and Thickness Change Rate Analysis of Lithium Secondary Battery The following experiments were preformed in order to investigate life characteristic and thickness change rate of the lithium secondary batteries prepared in Examples 4 to 6, and Comparative Examples 6 and 8 to 10.

With respect to the life characteristics of the lithium secondary battery, charge and discharge were performed at 0.5 C from a third cycle, and a ratio of discharge capacity in a $1^{st}$ cycle to discharge capacity in a $49^{th}$ cycle was measured.

With respect to the thickness change rate, a thickness of an electrode was measured by disassembling each lithium secondary battery in a charge state at a $50^{th}$ cycle, and then compared with the thickness of the electrode before the first cycle.

TABLE 1

| Example | Life characteristics (%) | Thickness change rate (%) |
| --- | --- | --- |
| Example 4 | 92 | 74 |
| Example 5 | 91 | 73 |
| Example 6 | 90 | 71 |
| Comparative Example 6 | 87 | 113 |
| Comparative Example 8 | 88 | 125 |
| Comparative Example 9 | 86 | 91 |
| Comparative Example 10 | 81 | 87 |

Life characteristics: (discharge capacity in the $49^{th}$ cycle/discharge capacity in the first cycle)×100

Thickness change rate: (thickness of an electrode in a charge state at the $50^{th}$ cycle−thickness of the electrode before the first cycle)/thickness of the electrode before the first cycle×100

As illustrated in Table 1, the lithium secondary batteries of Examples 4 to 6 including SiO and graphite having a surface coated with amorphous carbon as an anode active material, according to the present invention, exhibited significant difference in life characteristics and thickness change rate in comparison to Comparative Examples 6 to 10 including graphite not coated with amorphous carbon, or coated with a small amount or an excessive amount of amorphous carbon, as an anode active material.

That is, since the crystal orientation ratios of the electrodes of the lithium secondary batteries according to the embodiment of the present invention were in a range of 0.07 to 0.17, it may be understood from Table 1 that the life characteristics were improved and the thickness change rates were small.

EXPERIMENTAL EXAMPLE 2

Initial Discharge Capacity Analysis of Lithium Secondary Battery

In order to investigate initial discharge capacity and discharge capacity per volume of an electrode after 50 cycles of the lithium secondary batteries prepared in Examples 4 to 6, and Comparative Examples 6 and 8 to 10, the lithium secondary batteries prepared in Examples 4 to 6 and Comparative Examples 6 to 10 were charged at a constant current (0.5 C) to a voltage of 5 mV. Then, the charging was stopped until the current reached 0.005 C at 5 mV, and then terminated. The batteries were discharged at a constant current (0.5 C) to a voltage of 1.0 V. The final $50^{th}$ cycle was terminated in a charge state and a thickness of the electrode was then measured by disassembling each cell. The volume of the electrode was calculated from the thickness obtained.

TABLE 2

| Example | Initial discharge capacity (mAh/g) | Discharge capacity per volume of the electrode in a charge state at the $50^{th}$ cycle (mAh/cc) |
|---|---|---|
| Example 4 | 476.51 | 458.5 |
| Example 5 | 474.72 | 457.3 |
| Example 6 | 471.28 | 455.2 |
| Comparative Example 6 | 470.89 | 439.7 |
| Comparative Example 7 | 359.32 | 406.3 |
| Comparative Example 8 | 470.95 | 440.1 |
| Comparative Example 9 | 458.92 | 427.1 |
| Comparative Example 10 | 451.63 | 421.5 |

As illustrated in Table 2, it may be understood that the initial discharge capacities of the lithium secondary batteries of Examples 4 to 6 including SiO and graphite having a surface coated with amorphous carbon as an anode active material, according to the present invention, were higher than those of Comparative Examples 6 to 10 including graphite having a surface not coated with amorphous carbon, or coated with a small amount or an excessive amount of amorphous carbon, as an anode active material. Also, it may be understood that the discharge capacities per unit volume of the electrode in a charge state at the $50^{th}$ cycle were significantly higher than those of Comparative Examples 6 to 10.

Therefore, since the anodes according to the embodiment of the present invention include $SiO_x$ (0<x≤1) and a carbon material coated with amorphous carbon and have crystal orientation ratios satisfying a range of 0.07 to 0.17, it may be understood that the initial discharge capacity and discharge capacity per volume of the electrode in a charge state at the $50^{th}$ cycle of the lithium secondary batteries were significantly improved in comparison to those of the lithium batteries of the comparative examples.

While this invention has been particularly shown and described with reference to exemplary embodiments thereof, it will be understood by those skilled in the art that various changes in form and details may be made therein without departing from the spirit and scope of the invention as defined by the appended claims.

The exemplary embodiments should be considered in descriptive sense only and not for purposes of limitation. Therefore, the scope of the invention is defined not by the detailed description of the invention but by the appended claims, and all differences within the scope will be construed as being included in the present invention.

INDUSTRIAL APPLICABILITY

The anode according to an embodiment of the present invention may use the advantages of a silicon-based material for increasing a capacity by including $SiO_x$ (0<x≤1) and a carbon material having a surface coated with amorphous carbon, and simultaneously, may decrease a degree of thickness expansion of an entire battery by using the carbon material. In addition, the crystal orientation ratio of the anode may be controlled by coating the surface of the carbon material with amorphous carbon, and thus, the anode may further improve an initial discharge capacity and decrease a volume expansion.

The invention claimed is:

1. A lithium secondary battery comprising:
   a cathode;
   an anode comprising an anode active material including $SiO_x$ (0<x≤1) and a carbon material having a surface coated with amorphous carbon,
   wherein a crystal orientation ratio of the anode is in a range of 0.07 to 0.17,
   the amorphous carbon is included in an amount ranging from 0.1 wt % to 10 wt % based on the carbon material, and
   the amorphous carbon is only coated on the carbon material; and
   a separator disposed between the cathode and the anode;
   wherein the cathode comprises a cathode active material selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1),$Li_x(Ni_aCo_bMn_c)O_4$ (0.5<x<1.3, 0<a<2,0<c<2, a+b+c=2),$Li_xMn_{2-z}Ni_zO_4$ (0.5<x<1.30<z<2), $Li_xMn_{2-z}Co_zO_4$ (0.5<x<1.3, 0<z<2), or a mixture of two or more thereof.

2. The lithium secondary battery of claim 1, wherein a density of the anode is in a range of 1.5 g/cc to 1.6 gicc.

3. The lithium secondary battery of claim 1, wherein the carbon material comprises one or more selected from the group consisting of natural graphite, artificial graphite, mesocarbon microbeads (MCMB), carbon fibers, and carbon black.

4. The lithium secondary battery of claim 1, wherein the crystal orientation ratio is an area ratio ((110)/(004)) obtained by measuring a (110) plane and a (004) plane of the anode active material included in the anode by X-ray diffraction (XRD), and integrating each measured XRD peak.

5. The lithium secondary battery of claim 1, wherein a weight ratio of the $SiO_x$ (0<x≤1) to the carbon material having a surface coated with amorphous carbon is in a range of 3:97 to 70:30.

6. The lithium secondary battery of claim 1, wherein the $SiO_x$ (0<x<1) is silicon monoxide.

7. The lithium secondary battery of claim 1, wherein the amorphous carbon comprises hard carbon, soft carbon, or a mixture thereof.

8. The lithium secondary battery of claim 1, wherein a coating thickness of the amorphous carbon is in a range of 10 nm to 700 nm.

* * * * *